United States Patent [19]

Gilchrist

[11] Patent Number: 5,322,545
[45] Date of Patent: Jun. 21, 1994

[54] METHOD OF PRODUCING URANIUM METAL

[75] Inventor: Paul Gilchrist, Preston, United Kingdom

[73] Assignee: British Nuclear Fuels, plc, Warrington, England

[21] Appl. No.: 888,818

[22] Filed: May 27, 1992

[30] Foreign Application Priority Data

May 31, 1991 [GB] United Kingdom ............... 9111666

[51] Int. Cl.$^5$ ............................................. C22B 60/02
[52] U.S. Cl. ........................................ 75/399; 75/398; 204/1.5; 423/257; 423/5
[58] Field of Search .................. 75/344, 398, 399; 423/257, 5; 204/1.5

[56] References Cited

U.S. PATENT DOCUMENTS

| | | | |
|---|---|---|---|
| 2,985,528 | 5/1961 | Fitzer | 75/399 |
| 3,140,171 | 7/1964 | Trapp | 75/399 |
| 3,169,057 | 2/1965 | Knighton et al. | 75/396 |
| 3,282,681 | 11/1966 | Knighton et al. | 75/396 |
| 3,284,190 | 11/1966 | Knighton et al. | 423/5 |
| 3,326,673 | 6/1967 | Knighton et al. | 75/396 |
| 3,850,623 | 11/1974 | Sheller | 75/399 |
| 3,982,928 | 9/1976 | Chiotti et al. | 75/399 |
| 4,032,328 | 6/1977 | Hurd | 75/395 |
| 4,534,792 | 8/1985 | Elliott | 75/399 |
| 4,552,588 | 11/1985 | Elliott | 75/399 |
| 5,160,367 | 11/1992 | Pierce et al. | 75/397 |
| 5,164,050 | 11/1992 | Bertaud et al. | 204/1.5 |

FOREIGN PATENT DOCUMENTS

| | | |
|---|---|---|
| 0408468 | 1/1991 | European Pat. Off. |
| 1533141 | 11/1969 | Fed. Rep. of Germany |
| 1212774 | 3/1960 | France |
| 1179679 | 5/1969 | France |
| 86/07097 | 12/1986 | PCT Int'l Appl. |
| 810033 | 3/1959 | United Kingdom |
| 814195 | 6/1959 | United Kingdom |
| 846490 | 8/1960 | United Kingdom |

OTHER PUBLICATIONS

The Chemistry of Uranium, Part I, The Element, Its Binary, and Related Compounds, National Nuclear Energy Series, Manhattan Project Technical Section, Division VIII, vol. 5.

Primary Examiner—Donald P. Walsh
Assistant Examiner—Ngoclan T Mai
Attorney, Agent, or Firm—Larson and Taylor

[57] ABSTRACT

Uranium chloride is reacted with either magnesium, sodium or calcium in the presence of a molten salt comprising light metal chlorides including lithium chloride. The temperature is maintained below the melting point of uranium. The magnesium may be in the form of magnesium-cadmium alloy, the temperature being maintained below the temperature at which magnesium and cadmium vaporize. The components of the molten salt may be first fused together so as to form the molten salt eutectic. Subsequently after separation of the uranium, products of the reaction may be recovered and recycled.

13 Claims, 2 Drawing Sheets

METHOD OF PRODUCING URANIUM METAL

This invention relates to a method of producing uranium metal.

It is known to reduce uranium fluorides to uranium metal by reaction with magnesium metal, the reaction being carried out by placing compacts in the form of pellets of magnesium turnings and uranium fluoride powder in a sealed reaction vessel and heating the vessel to overcome the activation energy of the reaction. Once the reaction commences it follows an exothermic path with the generation of high temperatures (e.g. 1400°–1500° C.) and pressures (e.g. 2–5 bar) within the vessel. This produces molten uranium which cools to form a solid uranium billet with a deposit of magnesium fluoride slag on the top of the billet. Some disadvantages of this process are: the generation of the high temperatures and pressures giving rise to the need for containment in a pressure vessel; the generation of magnesium vapour and the production of molten uranium, both of which are corrosive and require special care in the selection of materials of construction. The process also has to be carried out in a batchwise manner.

Other known processes include those described in U.S. Pat. Nos. 4,534,792 and 4,552,588 but both suffer the disadvantage of high temperature operation and produce molten uranium.

It is an object of the invention to provide a method of producing uranium metal capable of being performed at a temperature below the melting point of uranium.

According to the present invention there is provided a method of producing uranium metal, the method comprising reacting uranium chloride with a reductant selected from the group consisting of magnesium, sodium, and calcium in the presence of a molten salt having components comprising light metal chlorides, one of the components being lithium chloride, whilst maintaining the temperature below the melting point of uranium.

Preferably, the reductant comprises magnesium, the molten salt includes magnesium chloride as one of the components, and the temperature is controlled so as to be below the temperature at which magnesium vaporizes.

Advantageously, the reductant comprises a magnesium-cadmium alloy, and the temperature is controlled so as to be below the temperature at which cadmium vaporizes.

Cadmium is preferably selected since above 475° C. it is one of the very few metals which do not form intermetallic compounds with uranium and does not pose a problem with respect to oxidation of uranium.

Magnesium chloride from the reaction may be electrolysed to recover magnesium and chlorine therefrom. The recovered magnesium may be recycled either to react with fresh uranium chloride or to form fresh magnesium-cadmium alloy which can be returned to the reactor to react with the uranium chloride. The chlorine may be recycled to an upstream process for the manufacture of fresh uranium chloride.

Preferably, after the cadmium has been separated from the solid uranium metal product, it is recycled to form magnesium-cadmium alloy which said alloy may be reacted with the uranium chloride.

Advantageously, sodium chloride may be included as a component of the molten salt so as to lower the temperature of the salt melt eutectic, the components of the molten salt being first fused together so as to form the molten salt eutectic.

After the reaction the solid uranium metal product may be separated by filtration and/or other known methods.

It will be understood that reference herein to uranium chloride includes those single chlorides of uranium in which the uranium is found in only one of its valency states.

BRIEF DESCRIPTION OF THE DRAWINGS

The invention will now be further described, by way of example only, with reference to the accompanying drawings, in which:

Referring now to FIG. 1, a system 10 is shown having a reactor vessel 13 to which three inlet lines 19, 22, 49 respectively connect. An upper outlet line 43 from the reactor vessel 13 connects with an electrolysis plant 46 from which the inlet line 49 extends to the reactor vessel 13. An outlet line 52 extends from the electrolysis plant 46 to an alloying plant 40, and a gas line 55 provides a vent from the electrolysis plant 46. Inlet line 22 extends from the alloying plant 40 to the reactor vessel 13. A lower outlet line 28 from the reactor vessel 13 connects with a filter plant 31 having an outlet line 33 which connects with a distillation plant 34. From the distillation plant 34 an outlet line 37 extends to the alloying plant 40 and another outlet 32 from the filter plant 31 connects with the outlet line 37. Another outlet line 35 from the distillation plant 34 provides a discharge from the system 10. A heating jacket (not shown) about the vessel 13 controls the temperature inside the vessel 13 through the use of conventional temperature sensing devices 45 and a temperature controller 47.

Figure 1:
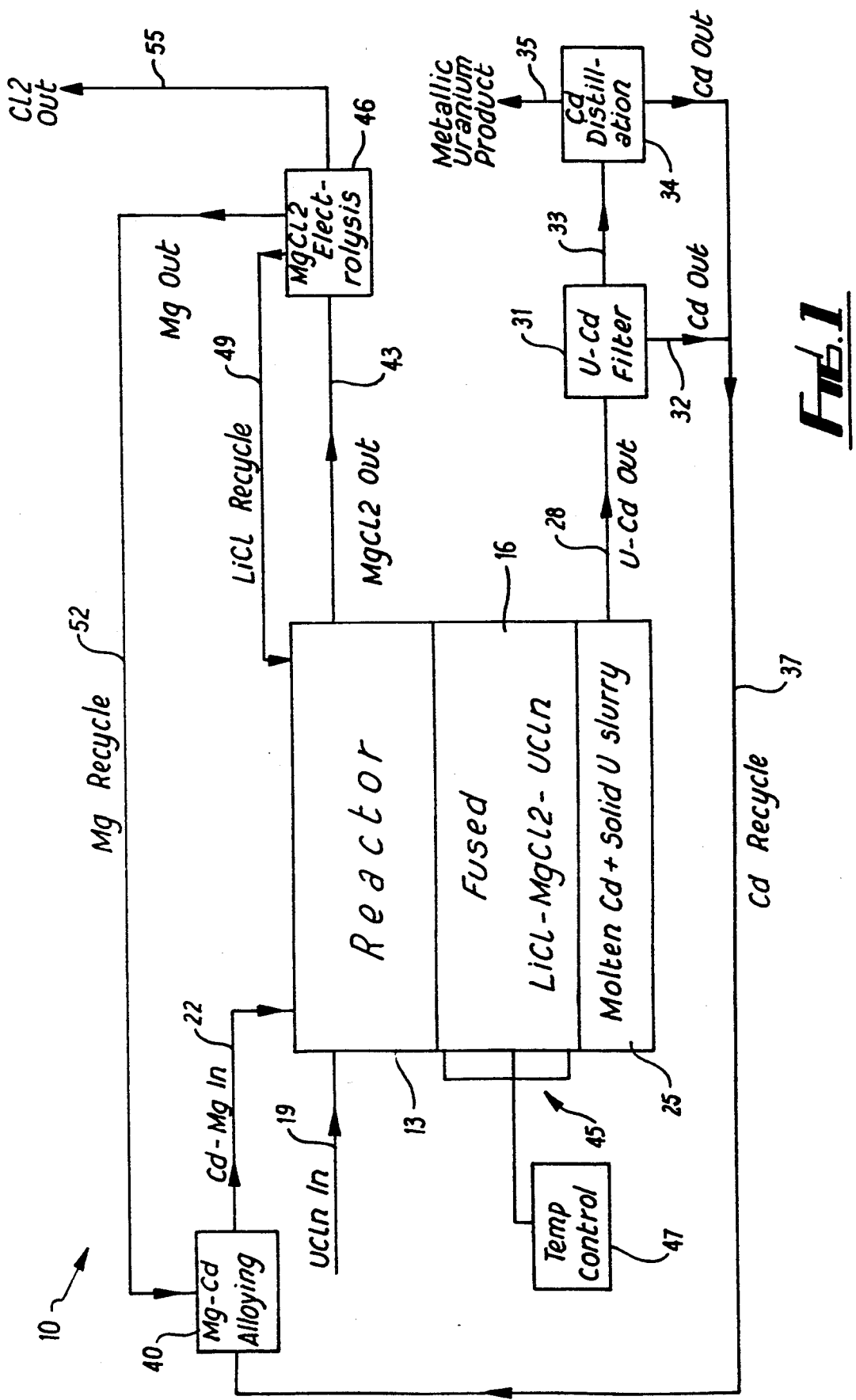
FIG. 1 shows a flow diagram for a process for the production of uranium metal.

The reactor vessel 13 contains, for example, a lithium chloride-magnesium chloride molten salt eutectic 16. The components of the molten salt 16 are first fused together at a high temperature and the resulting molten salt eutectic 16 is held at a temperature of less than 720° C. by the use of the heating jacket under the control of the temperature controller 47. Uranium chloride in powder form is introduced in the reactor vessel 13 through the inlet line 19, and dissolves to a slight extent in the molten salt eutectic 16, undissolved uranium chloride powder dispersing in the molten salt eutectic 16. Magnesium reductant in the form of particles of a magnesium-cadmium alloy is introduced into the reactor vessel 13 through the inlet line 22. Since the magnesium-cadmium alloy is denser that the molten salt eutectic 16, the alloy particles sink into the molten salt eutectic 16. On entering the molten salt eutectic 16, the cadmium in the magnesium-cadmium alloy melts and sinks to the bottom of the reactor vessel 13 where it forms part of a layer 25. The magnesium in the magnesium-cadmium alloy dissolves in the molten salt eutectic 16 where it reacts with dissolved uranium chloride. The magnesium reduces the uranium chloride to uranium metal and forms a magnesium chloride by-product. Since the temperature of the reaction is less than the melting temperature of uranium, a solid uranium metal product is formed which sinks to the bottom of the reactor vessel 13 and forms a slurry with the molten cadmium in the layer 25. The magnesium chloride by-product remains dissolved in the molten salt eutectic 16. The cadmium and solid uranium slurry is removed from the reactor vessel 13 through the outlet line 28, and the uranium metal product is separated from the liquid cadmium by passing the slurry through the filter plant 31, the filtrate being passed for distillation in the plant 34. The uranium metal product is discharged from the system 10 through the outlet line 35 from the distillation plant 34. The separated cadmium is recycled through the line 37 to the alloying plant 40 where it is formed into magnesium-cadmium alloy which can again be introduced into the reactor vessel 13 through the inlet line 22. Molten salt eutectic 16 is removed from the reactor vessel 13 through the outlet line 43 and is subjected to electrolysis in the plant 46 in which magnesium chloride is electrolysed to produce recovered magnesium and recovered chlorine. The lithium chloride in the molten salt eutectic is unaffected by the electrolysis since it has a higher electrodecomposition voltage than the magnesium chloride, and is recycled to the reactor vessel 13 through the inlet line 49. The recovered magnesium is recycled through the line 52 to the alloying plant 40 where it is combined with the separated cadmium from the plants 31 and 34 to form magnesium-cadmium alloy which is reintroduced into the reactor vessel 13 through the inlet line 22. The recovered chlorine is recycled through the gas line 55 to a separate known process upstream (not shown) for the manufacture of uranium chloride which may then be introduced to the reactor vessel 13 through the inlet line 19. When the molten salt eutectic 16 is removed from the reactor vessel 13 through the line 43 some unreacted uranium chloride may be carried over into the electrolysis plant 46. Since the electrodecomposition voltage of the uranium chloride is slightly lower than that of magnesium chloride some uranium and chlorine may be produced. Any uranium produced is recycled back into the system with the lithium chloride and/or magnesium, and the chlorine is recycled through the gas line 55.

Figure 2:
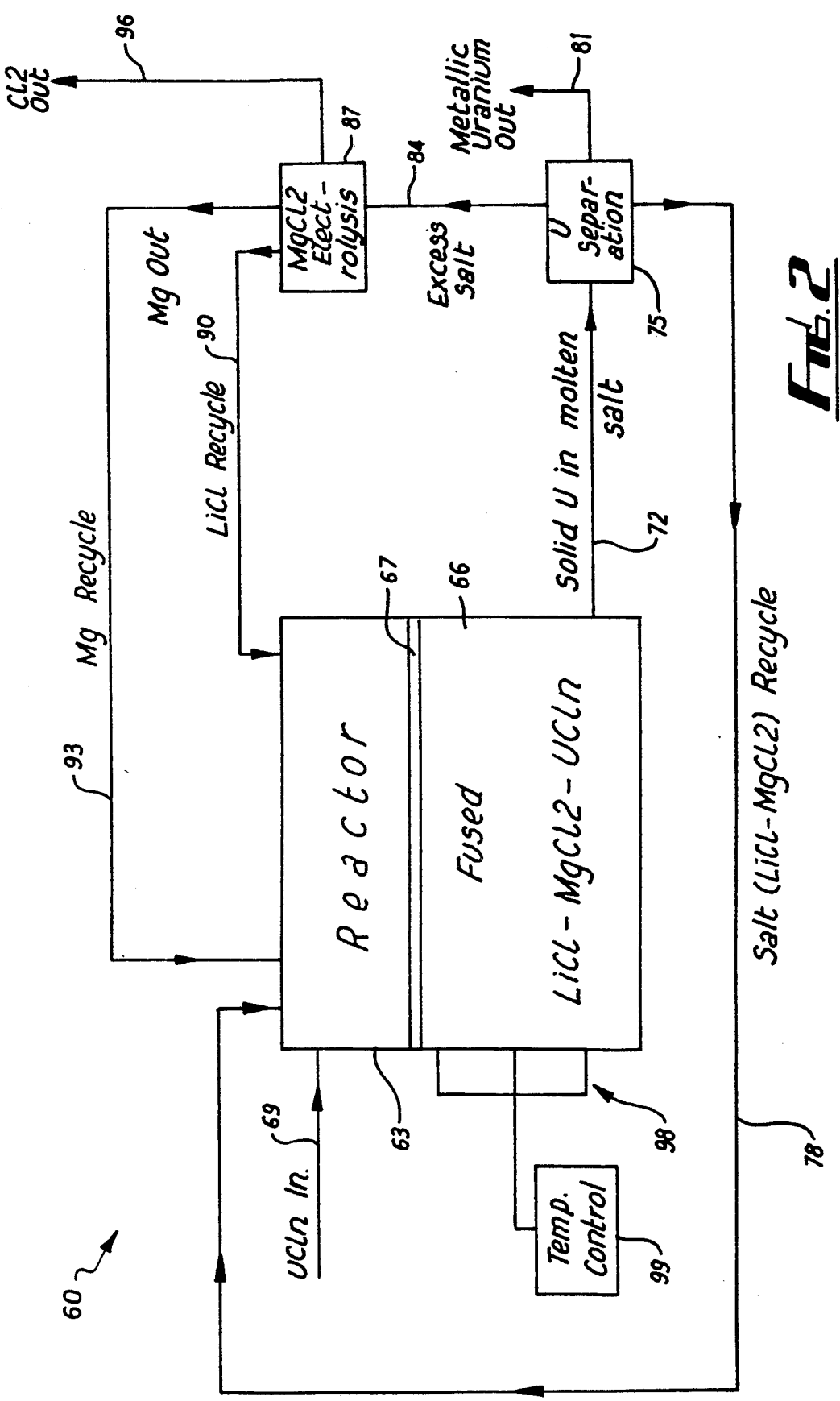
FIG. 2 shows a flow diagram for a modified form of the process of FIG. 1.

An alternative embodiment of the invention is shown in FIG. 2, a system 60 having a reactor vessel 63 with a heating jacket (not shown) and to which four inlet lines 69, 78, 90 and 93 respectively connect. A lower outlet line 72 from the reactor vessel 63 connects with a separation plant 75 from which the inlet line 78 extends to the reactor vessel 63. An outlet line 84 extends from the separation plant 75 to connect with an electrolysis plant 87, and an outlet line 81 provides a discharge from the system 60. The inlet lines 90 and 93 extend from the electrolysis plant 87 to the reactor vessel 63, and a gas line 96 provides a vent from the electrolysis plant 87. Conventional temperature sensing devices 98 and a temperature controller 99 control the heating jacket and thereby the temperature inside the vessel 63.

The reactor vessel 63 contains, for example, a lithium chloride-magnesium chloride molten salt eutectic 66 which is held at a temperature of less than 750° C. by use of the heating jacket under the control of the temperature controller 99. Uranium chloride powder is introduced into the reactor vessel 63 through the inlet line 69. Magnesium reductant in the form of discrete particles of magnesium metal is introduced into the reactor vessel 63 through the inlet line 93 to react with the uranium chloride. Of the magnesium metal which does not immediately react with the uranium chloride, some dissolves in the molten salt eutectic 66, and since the temperature of the molten salt eutectic 16 is above the melting temperature of the magnesium metal, the remaining magnesium metal forms a layer 67 of molten magnesium metal on top of the molten salt eutectic 66. Reaction occurs between the uranium chloride dissolved in the molten salt eutectic 66 and the magnesium metal dissolved in the molten salt eutectic 66 and in the layer 67. Since the temperature at which the reaction takes place is below the melting temperature of uranium metal, the uranium metal produced is in the solid state and sinks to the bottom of the reactor vessel 63. The magnesium chloride formed as a by-product dissolves in the molten salt eutectic 66. By the action of the solid uranium metal produced sinking (or precipitating) through the molten salt eutectic 66 to the bottom of the reactor vessel 63, the molten salt eutectic 66 is agitated so that molten salt eutectic layers containing dissolved uranium chloride are continuously being presented for reaction with the molten magnesium in the layer 67 at the interface and that dissolved in the molten salt eutectic 66. The solid uranium metal product is removed from the bottom of the reactor vessel 63 through the outlet line 72 as a suspension with molten salt eutectic 66, and is separated from the molten salt eutectic 66 by known methods, for example filtration, or melting in the separation plant 75. The uranium metal product is discharged from the system 60 through the outlet line 81 from the separation plant 75. Separated molten salt eutectic 66 is recycled directly to the reactor vessel 63 through the line 78. Excess molten salt eutectic 66 is transferred through the line 84 to the electrolysis plant 87 in which magnesium chloride in the molten salt eutectic 66 is electrolysed to yield recovered magnesium and recovered chlorine. As described in relation to the system of FIG. 1, the lithium chloride in the salt eutectic 66 is unaffected by the electrolysis and is recycled to the reactor vessel 63 through the inlet line 90. Recovered magnesium is recycled directly to the reactor vessel 63 through the inlet line 93, and recovered chlorine is recycled through the gas line 96 to a process (not shown) for the manufacture of uranium chloride as described in relation to FIG. 1.

One of the advantages of the invention is that the method is operated at a temperature at which the uranium metal produced is solid, and below the temperature at which magnesium vaporizes. Hence the aforementioned problems concerning corrosion of the materials in the system are to some extent alleviated.

Control of the feed of the magnesium to react with the uranium chloride, using conventional means, assists in the control of the amount of heat generated in the reactor vessel 63. Furthermore, the presence of lithium chloride in the molten salt eutectic depresses the melting point of the molten salt eutectic and allows a relatively low operating temperature to be used.

Another advantage is that the method may be operated on a continuous basis, and all or most of the by-products produced can be recycled in the method.

Yet a further a advantage is that the method may be operated at near ambient pressure in an inert atmosphere (e.g. argon, nitrogen) in contrast to methods for the reduction of uranium fluorides which take place within a pressure vessel and generate high temperatures and pressures.

Although three temperature sensing devices have been shown in FIGS. 1 and 2, fewer or more temperature sensing devices may be used to suit particular applications.

If desired the molten salt eutectic could contain alternative components or numbers of components. It will be appreciated that although the invention has been described in relation to the use of magnesium as a reductant other reductants such as sodium, or calcium may be used.

I claim:

1. A method of producing uranium metal, the method comprising reacting in a reaction vessel at a temperature below the melting point of uranium, uranium chloride with a reductant comprising a member selected from the group consisting of magnesium, sodium and calcium in the presence of a molten salt having components comprising light metal chlorides, one of the components being lithium chloride, to produce a reaction product comprising solid uranium metal which sinks to the bottom of the reaction vessel, and a magnesium chloride by-product dissolved in the molten salt, and recovering the uranium metal product.

2. A method according to claim 1 wherein said temperature is less than 720° C.

3. A method as claimed in claim 2, wherein the reductant comprises magnesium, the molten salt includes magnesium chloride as one of the components, and the temperature is maintained below the temperature at which magnesium vaporises.

4. A method as claimed in claim 3, further comprising electrolysing said magnesium chloride and recovering magnesium and chlorine therefrom.

5. A method as claimed in claim 4, including recycling the recovered magnesium to react with unreacted uranium chloride.

6. A method as claimed in claim 2, wherein the reductant comprises a magnesium-cadmium alloy, wherein the temperature is maintained below the temperature at which cadmium vaporises, and wherein said reaction product comprises molten cadmium which sinks to the bottom of the reaction vessel.

7. A method as claimed in claim 6, further comprising separating the cadmium product and the solid uranium metal product.

8. A method as claimed in claim 1, wherein sodium chloride is included as a component of the molten salt.

9. A method as claimed in claim 1, wherein the components of the molten salt are first fused together so as to form a molten salt eutectic.

10. A method as claimed in claim 1, wherein said uranium metal product is recovered by filtration.

11. A method as claimed in claim 1, wherein the method is operated at near ambient pressure.

12. A method as claimed in claim 1, wherein the reductant is fed to assist in controlling the amount of heat generated by reaction of the uranium chloride and the reductant.

13. A method according to claim 7 further comprising combining said separated cadmium with magnesium to form fresh magnesium-cadmium alloy, and subsequently reacting said fresh alloy with unreacted uranium chloride.

* * * * *